(12) United States Patent
Yamaguchi

(10) Patent No.: US 10,778,382 B2
(45) Date of Patent: Sep. 15, 2020

(54) PARAMETER SETTING TRANSMISSION AND RECEPTION SYSTEM AND PARAMETER SETTING METHOD

(71) Applicant: FUJITSU LIMITED, Kawasaki-shi, Kanagawa (JP)

(72) Inventor: Hisakatsu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/525,656

(22) Filed: Jul. 30, 2019

(65) Prior Publication Data

US 2020/0044795 A1 Feb. 6, 2020

(30) Foreign Application Priority Data

Aug. 6, 2018 (JP) ................................ 2018-147316

(51) Int. Cl.
*H04L 1/24* (2006.01)
*H04L 7/00* (2006.01)
*H04L 1/20* (2006.01)

(52) U.S. Cl.
CPC .............. *H04L 1/246* (2013.01); *H04L 1/203* (2013.01); *H04L 1/244* (2013.01); *H04L 7/007* (2013.01)

(58) Field of Classification Search
CPC ......... H04L 1/246; H04L 1/203; H04L 1/244; H04L 7/007
See application file for complete search history.

(56) References Cited

U.S. PATENT DOCUMENTS

| 7,895,366 B2 * | 2/2011 | Hibi .................... G06F 13/385 710/104 |
| 2004/0041652 A1 | 3/2004 | Takahashi |
| 2008/0247452 A1* | 10/2008 | Lee .................. H04L 25/03019 375/232 |
| 2010/0275084 A1 | 10/2010 | Ichimiya et al. |

FOREIGN PATENT DOCUMENTS

| JP | 2004-015622 A | 1/2004 |
| JP | 2010-258841 A | 11/2010 |

* cited by examiner

*Primary Examiner* — Janice N Tieu
(74) *Attorney, Agent, or Firm* — Fujitsu Patent Center

(57) ABSTRACT

A system includes the transmitter that transmits a first adjustment signal obtained based on a first parameter, detects, based on an output potential of the transmitter, a second parameter that is among values settable to the first parameter and sets the second parameter and the receiver that receives the first adjustment signal from the transmitter and acquire a second adjustment signal by adjusting the first adjustment signal based on a third parameter, sets the third parameter, counts the number of errors of the second adjustment signal based on a difference between the second adjustment signal and the test pattern, determines, based on the number of errors of the second adjustment signal, the second parameter to be set in the transmitter and controls the connection of the terminal resistor to the input terminal based on the second parameter.

5 Claims, 9 Drawing Sheets

PARAMETER SETTING TRANSMISSION AND RECEPTION SYSTEM AND PARAMETER SETTING METHOD

CROSS-REFERENCE TO RELATED APPLICATION

This application is based upon and claims the benefit of priority of the prior Japanese Patent Application No. 2018-147316, filed on Aug. 6, 2018, the entire contents of which are incorporated herein by reference.

FIELD

The embodiment relates to a parameter setting transmission and reception system and a parameter setting method.

BACKGROUND

To enable high performance of a computer such as a server or a supercomputer, the speed of a transmitting and receiving circuit for transmitting and receiving data between integrated circuits such as installed processors is increased. With the increase in the speed of the transmitting and receiving circuit, a variation in a characteristic of the transmitting and receiving circuit due to a manufacturing variation in the transmitting and receiving circuit, a change in a peripheral temperature, or a variation in a power supply voltage is noticeable. Thus, characteristic turning is executed.

A technique is known, which updates a resistance value of a receiving terminal portion installed at a terminal of a transmission path to an appropriate value within a terminal adjustment time period in response to the detection of an error of received data.

For example, as related art, Japanese Laid-open Patent Publication No. 2010-258841 and Japanese Laid-open Patent Publication No. 2004-15622 have been disclosed.

Since an effect of the manufacturing variation, an effect of the change in the peripheral temperature, or an effect of the variation in the power supply voltage appears in a transmission signal, the related-art characteristic turning is executed by only a receiving circuit. In the case where the turning is executed by only the receiving circuit, as a range of the manufacturing variation, a range of the change in the peripheral temperature, or a range of the variation in the power supply voltage is larger, the size of the receiving circuit is larger and it is more difficult to reduce power to be consumed.

Under such circumstances, it is desirable to reduce power to be consumed by a parameter setting transmission and reception system.

SUMMARY

According to an aspect of the embodiments, a parameter setting transmission and reception system includes a transmitter and a receiver that is connected to the transmitter via a transmission path, wherein the transmitter transmits a first adjustment signal obtained by adjusting a transmission signal of a test pattern based on a first parameter, the transmitter detects, based on an output potential of the transmitter, a second parameter that is among values settable to the first parameter and has been determined by the receiver, the transmitter sets the second parameter determined by the receiver, the receiver includes a terminal resistor that is connected to an input terminal of the receiver, and the input terminal of the receiver is connected to the transmission path, and the receiver is configured to receive the first adjustment signal from the transmitter and acquire a second adjustment signal by adjusting the first adjustment signal based on a third parameter, set the third parameter, count the number of errors of the second adjustment signal based on a difference between the second adjustment signal and the test pattern, determine, based on the number of errors of the second adjustment signal, the second parameter to be set in the transmitter, and control the connection of the terminal resistor to the input terminal based on the second parameter determined by the receiver.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An embodiment is described with reference to the accompanying drawings.

Figure 1:
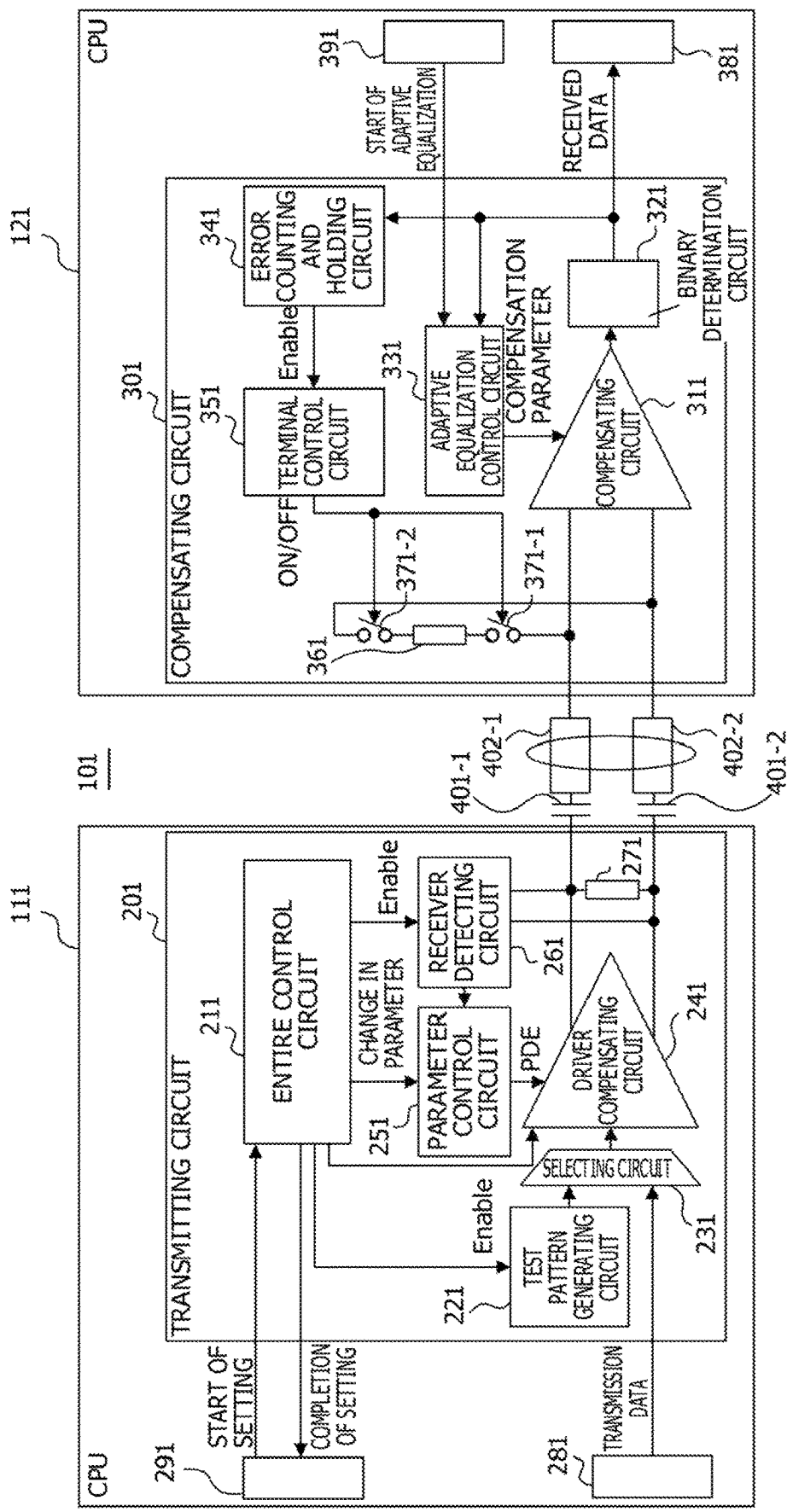
FIG. 1 is a configuration diagram illustrating a system according to an embodiment.

FIG. 1 is a configuration diagram illustrating a system according to the embodiment.

The system 101 includes central processing units (CPUs) 111 and 121. The CPUs 111 and 121 are installed in a computer such as a server, for example. The CPUs 111 and 121 may be installed in the same computer or may be installed in different computers, respectively.

The CPU 111 includes a transmitting circuit 201, a CPU core 281, and a transceiver control circuit 291. The CPU 121 includes a receiving circuit 301, a CPU core 381, and a transceiver control circuit 391. The transmitting circuit 201 may be installed outside the CPU 111. The receiving circuit 301 may be installed outside the CPU 121. The transmitting circuit 201 is an example of a transmitter. The receiving circuit 301 is an example of a receiver.

The transmitting circuit 201 is connected to the receiving circuit 301 via a capacitor 401-1 and a transmission path 402-1. The transmitting circuit 201 is connected to the receiving circuit 301 via a capacitor 401-2 and a transmission path 402-2. The capacitors 401-$i$ (i=1 and 2) are installed for AC coupling. It is assumed that characteristic impedance $Z_L$ of the transmission paths 402-$i$ is 50Ω.

The transmitting circuit 201 uses differential transmission to transmit data to the receiving circuit 301. The transmitting circuit 201 transmits a positive data signal (DT_POS) via the capacitor 401-1 and the transmission path 402-1 and transmits a negative data signal (DT_NEG) via the capacitor 401-2 and the transmission path 402-2. The transmission paths 402-$i$ are wirings of a printed circuit board, cables, or the like, for example. The negative data signal has a polarity opposite to a polarity of the positive data signal. The transmission paths 402-$i$ are differential signal lines.

The transmitting circuit 201 includes an entire control circuit 211, a test pattern generating circuit 221, a selecting circuit 231, a driver compensating circuit 241, a parameter control circuit 251, a receiver detecting circuit 261, and a terminal resistor 271.

The entire control circuit 211 controls the test pattern generating circuit 221, the driver compensating circuit 241, the parameter control circuit 251, and the receiver detecting circuit 261. The entire control circuit 211 receives an instruction to start setting a parameter of the driver compensating circuit 241 from the transceiver control circuit 291. When the entire control circuit 211 completes the setting of the parameter of the driver compensating circuit 241, the entire control circuit 211 notifies the completion of the setting to the transceiver control circuit 291.

The test pattern generating circuit 221 generates a predefined test pattern based on a control signal from the entire control circuit 211 and outputs the test pattern to the selecting circuit 231.

The selecting circuit 231 selects either the test pattern input from the test pattern generating circuit 221 or transmission data input from the CPU core 281 and outputs the selected test pattern or the selected transmission data to the driver compensating circuit 241.

The driver compensating circuit 241 uses differential transmission to transmit data to the receiving circuit 301. The driver compensating circuit 241 includes a compensating circuit having a signal compensating function. The driver compensating circuit 241 adjusts a transmission signal based on a parameter PDE and outputs the adjusted transmission signal. The driver compensating circuit 241 is an example of a transmitter.

The parameter control circuit 251 changes the parameter PDE of the signal compensating function of the driver compensating circuit 241 under control by the entire control circuit 211 and sets the parameter PDE in the driver compensating circuit 241. The parameter control circuit 251 is an example of a first setting unit. The parameter PDE is an example of a first parameter.

The receiver detecting circuit 261 executes RX detection to determine whether the receiving circuit 301 is connected to the transmitting circuit 201. The receiver detecting circuit 261 executes RX detection to determine whether a terminal resistor 361 of the receiving circuit 301 is connected to first and second input terminals of the receiving circuit 301. Upon a process of setting the parameter of the driving compensating circuit 241, the receiver detecting circuit 261 executes the RX detection multiple times and determines the parameter of the driver compensating circuit 241 so that the parameter causes the number of errors of received data to be the smallest among results of the RX detection executed the multiple times. The receiver detecting circuit 261 is connected to a first output terminal of the transmitting circuit 201 and a second output terminal of the transmitting circuit 201. The positive data signal is output from the first output terminal. The negative data signal is output from the second output terminal. The receiver detecting circuit 261 is an example of a detecting unit.

The terminal resistor 271 is connected to the first output terminal of the transmitting circuit 201 and the second output terminal of the transmitting circuit 201. In the embodiment, a resistance value of the terminal resistor 271 is 100Ω.

The receiving circuit 301 includes a compensating circuit 311, a binary determination circuit 321, an adaptive equalization control circuit 331, an error counting and holding circuit 341, a terminal control circuit 351, the terminal resistor 361, and switches 371-$i$.

The compensating circuit 311 adjusts, based on a compensation parameter, the positive data signal input via the transmission path 402-1 and the negative data signal input via the transmission path 402-2. The compensating circuit 311 adjusts frequency characteristics of the positive and negative data signals based on the compensation parameter. For example, the compensating circuit 311 amplifies high frequency components of the positive and negative data signals. The compensating circuit 311 outputs the adjusted positive data signal and the adjusted negative data signal to the binary determination circuit 321. The compensating circuit 311 is an example of a receiving unit. The compensation parameter is an example of a third parameter.

The binary determination circuit 321 calculates a difference between the adjusted positive data signal and the adjusted negative data signal and determines, based on the calculated difference, whether received data is 0 or 1. The binary determination circuit 321 outputs the result of the determination as the received data to the error counting and holding circuit 341, the adaptive equalization control circuit 331, and the CPU core 381.

The adaptive equalization control circuit 331 receives an instruction to start adaptive equalization from the transceiver control circuit 391. Upon receiving the instruction to start the adaptive equalization, the adaptive equalization control circuit 331 starts the adaptive equalization and outputs the compensation parameter to the compensating circuit 311. During the adaptive equalization, the adaptive equalization control circuit 331 detects an error (or a difference between the received data and the test pattern generated by the test pattern generating circuit 221) of the received data and adjusts the compensation parameter to reduce the number (or the number of differences between the received data and the test pattern) of errors of the received data. The compensation parameter is an equalizer intensity, for example. The adaptive equalization control circuit 331 is an example of a second setting unit.

The error counting and holding circuit 341 detects an error (or a difference between the received data and the test pattern generated by the test pattern generating circuit 221) of the received data. The error counting and holding circuit 341 counts the number (or the number of differences between the received data and the test pattern) of errors detected for each of predetermined time periods that are terms of error checking (TECs) and holds (stores) the number of errors detected for each of the predetermined TECs. The error counting and holding circuit 341 is an example of an error counting unit and a determining unit.

The terminal control circuit 351 controls states (ON and OFF states) of the switches 371-$i$. Thus, the terminal control circuit 351 controls whether to connect the terminal resistor 361 to an input terminal of the receiving circuit 301. The positive or negative data signal is input to the input terminal of the receiving circuit 301. The terminal control circuit 351 is an example of a controller.

The terminal resistor 361 is connected to the first input terminal of the receiving circuit 301 via the switch 371-1 and connected to the second input terminal of the receiving circuit 301 via the switch 371-2. The positive data signal is input to the first input terminal of the receiving circuit 301 from the transmission path 402-1. The negative data signal is input to the second input terminal of the receiving circuit 301 from the transmission path 402-2. In the embodiment, a resistance value of the terminal resistor 361 is 100Ω.

The terminal resistor 271 is connected to one ends of the transmission paths 402-$i$ between the transmitting circuit 201 and the receiving circuit 301, while the terminal resistor 361 is connected to the other ends of the transmission paths 402-$i$ between the transmitting circuit 201 and the receiving circuit 301. The terminal resistors 271 and 361 inhibit transmission signals from being reflected at both ends of each of the transmission paths 402-$i$, inhibit waveforms of the transmission signals from being deformed, and improve electric characteristics of the transmission paths 402-$i$.

The switch 371-1 is installed between the terminal resistor 361 and the first input terminal of the receiving circuit 301. The positive data signal is input to the first input terminal of the receiving circuit 301 from the transmission path 402-1. The switch 371-1 is controlled by the terminal control circuit 351 to any of the ON and OFF states.

The switch 371-2 is installed between the terminal resistor 361 and the second input terminal of the receiving circuit 301. The negative data signal is input to the second input terminal of the receiving circuit 301 from the transmission path 402-2. The switch 371-2 is controlled by the terminal control circuit 351 to any of the ON and OFF states.

An RX detection function of causing a transmitting device to detect whether a receiving device is connected to the transmitting device is described below. The RX detection function is used with a technique such as Peripheral Component Interconnect (PCI) Express or Universal Serial Bus (USB).

Upon the execution of the RX detection, the entire control circuit 211 changes an output potential of the driver compensating circuit 241. Upon the execution of the RX detection, the entire control circuit 211 causes the driver compensating circuit 241 to operate in a common mode in which two output signals from the driver compensating circuit 241 have the same polarity. Time when the output potential of the transmitting circuit 201 changes varies depending on input impedance of the receiving circuit 301. By monitoring the time when the output potential changes, the receiver detecting circuit 261 detects whether the receiving circuit 301 is connected to the transmitting circuit 201.

Figure 2:
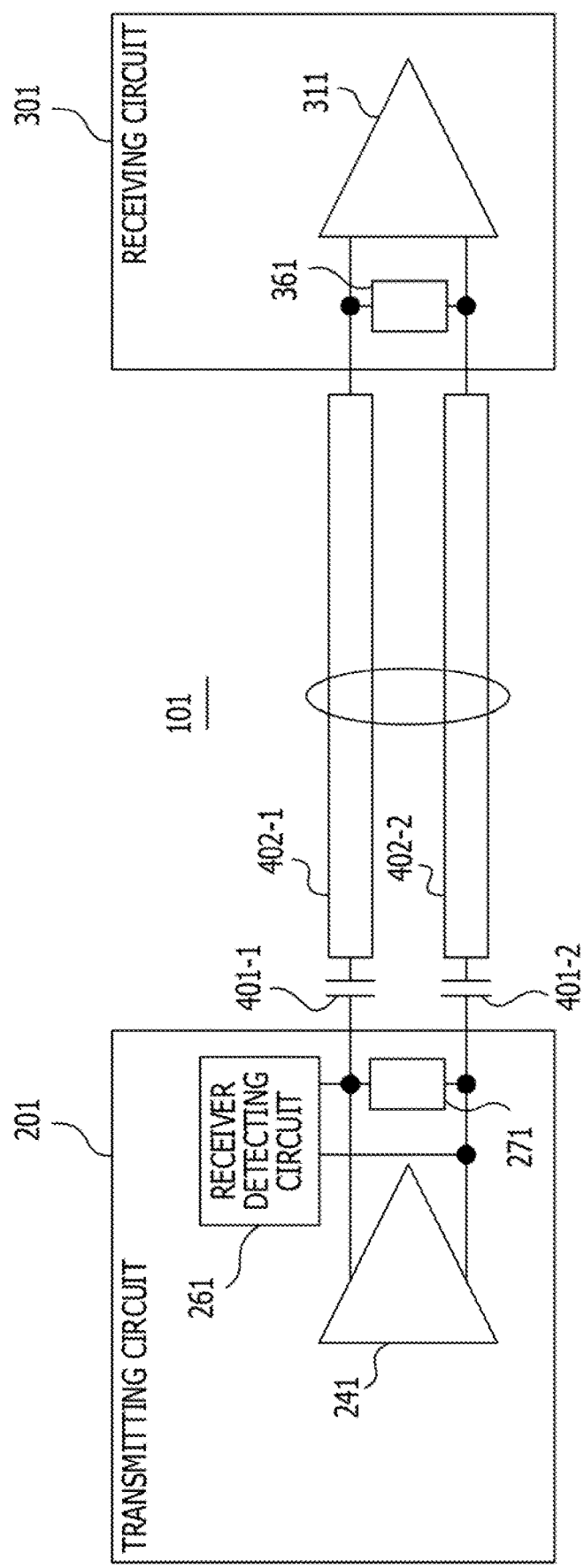
FIG. 2 is a configuration diagram illustrating the system in the case where a receiving circuit is connected.

FIG. 2 is a configuration diagram illustrating the system in the case where the receiving circuit is connected.

In FIG. 2, an illustration of some constituent elements of the system 101 is omitted to simplify the following description.

Figure 3:
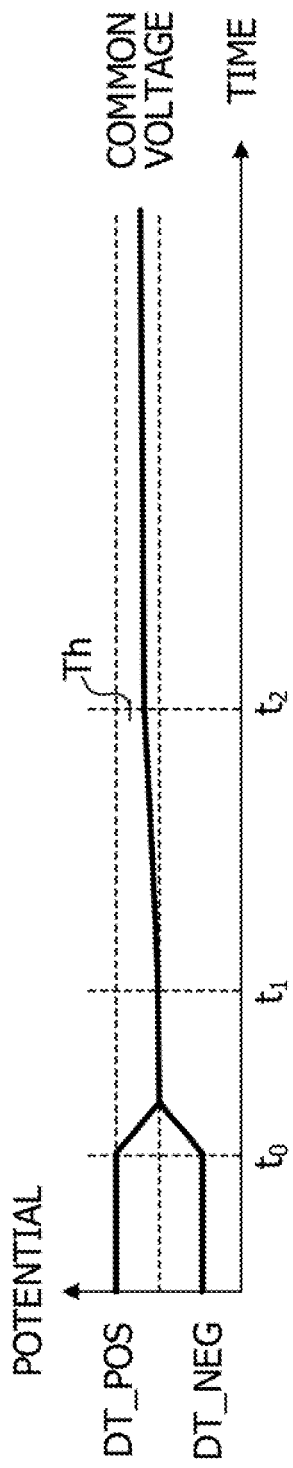
FIG. 3 is a diagram illustrating a common voltage upon the execution of RX detection in the case where the receiving circuit is connected.

FIG. 3 is a diagram illustrating a common voltage upon the execution of the RX detection in the case where the receiving circuit is connected. An ordinate illustrated in FIG. 3 indicates the output potential of the transmitting circuit 201, and an abscissa illustrated in FIG. 3 indicates time.

At time $t_0$, the entire control circuit 211 starts the RX detection. The entire control circuit 211 causes the driver compensating circuit 241 to operate in the common mode so that the two output signals from the driver compensating circuit 241 are at the same reference potential. The output potential of the transmitting circuit 201 in the common mode is hereinafter referred to as common voltage.

At time $t_1$, after a first time period elapses after the time $t_0$, a predetermined voltage starts being applied to the differential signal lines to which the signals of the driver compensating circuit 241 are output. When the receiving circuit 301 is connected to the transmitting circuit 201, the capacitors 401-$i$ for the AC coupling are to be charged and the rising of the common voltage is slow.

Thus, at time $t_2$ after a second time period elapses after the time $t_1$, the common voltage is equal to or lower than a threshold Th. When the common voltage is equal to or lower than the threshold Th at the time $t_2$, the receiver detecting circuit 261 determines that the receiving circuit 301 is connected to the transmitting circuit 201.

Figure 4:
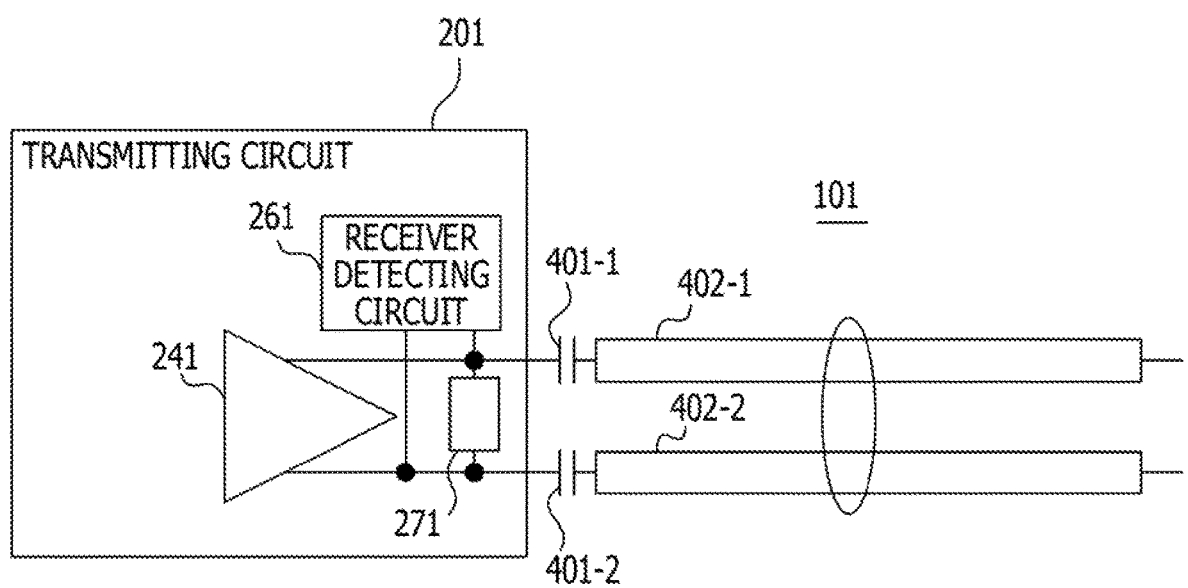
FIG. 4 is a configuration diagram illustrating the system in the case where the receiving circuit is not connected.

FIG. 4 is a configuration diagram illustrating the system in the case where the receiving circuit is not connected.

In FIG. 4, an illustration of some constituent elements of the system 101 is omitted to simplify the following description.

Figure 5:
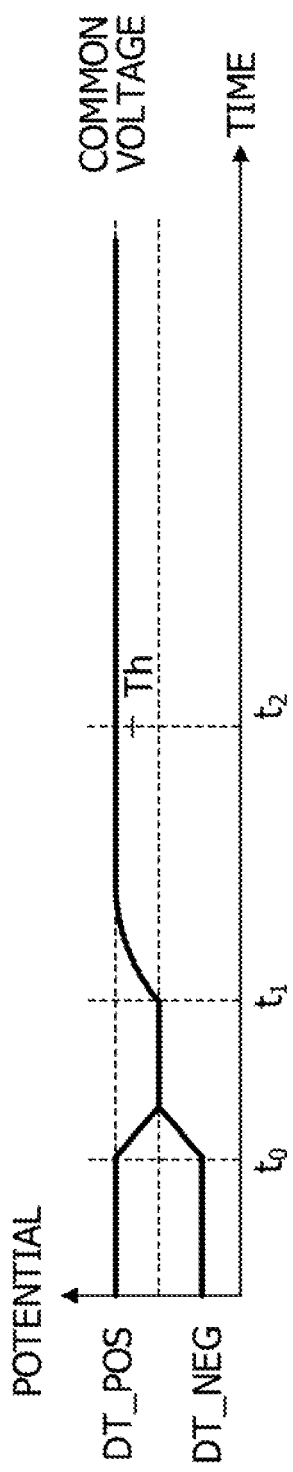
FIG. 5 is a diagram illustrating the common voltage upon the execution of the RX detection in the case where the receiving circuit is not connected.

FIG. 5 is a diagram illustrating the common voltage upon the execution of the RX detection in the case where the receiving circuit is not connected. An ordinate illustrated in FIG. 5 indicates the output potential of the transmitting circuit 201, and an abscissa illustrated in FIG. 5 indicates time.

At time $t_0$, the entire control circuit 211 starts the RX detection. The entire control circuit 211 causes the driver compensating circuit 241 to operate in the common mode so that the two output signals from the driver compensating circuit 241 are at the same reference potential.

At time $t_1$, after a first time period elapses after the time $t_0$, the predetermined voltage starts being applied to the differential signal lines to which the signals of the driver compensating circuit 241 are output. When the receiving circuit 301 is not connected to the transmitting circuit 201, the capacitors 401-$i$ for the AC coupling are not to be charged and the common voltage quickly rises.

Thus, at time $t_2$ after a second time period elapses after the time $t_1$, the common voltage is higher than the threshold Th. When the common voltage is higher than the threshold Th at the time $t_2$, the receiver detecting circuit 261 determines that the receiving circuit 301 is not connected to the transmitting circuit 201.

As described above, the RX detection is executed to determine whether the receiving circuit 301 is connected to the transmitting circuit 201.

The receiver detecting circuit 261 not only detects whether the receiving circuit 301 is connected to the transmitting circuit 201, but also uses the RX detection function to detect whether the terminal resistor 361 of the receiving circuit 301 is connected to the first and second input terminals of the receiving circuit 301.

Figure 6:
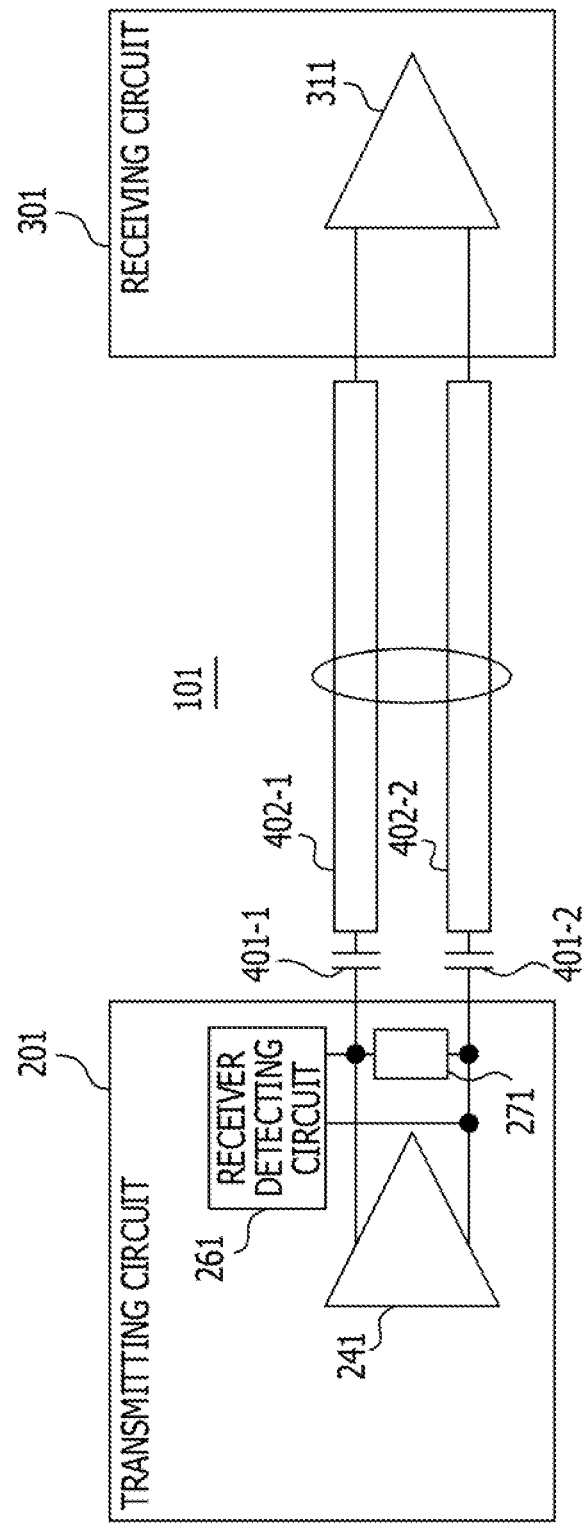
FIG. 6 is a configuration diagram illustrating the system in the case where a terminal resistor of the receiving circuit is not connected.

FIG. 6 is a configuration diagram illustrating the system in the case where the terminal resistor of the receiving circuit is not connected.

In FIG. 6, an illustration of some constituent elements of the system 101 is omitted to simplify the following description. FIG. 6 corresponds to the case where the receiving circuits 301 is connected to the transmitting circuit 201 but the switches 371-$i$ are in the OFF states illustrated in FIG. 1.

Figure 7:
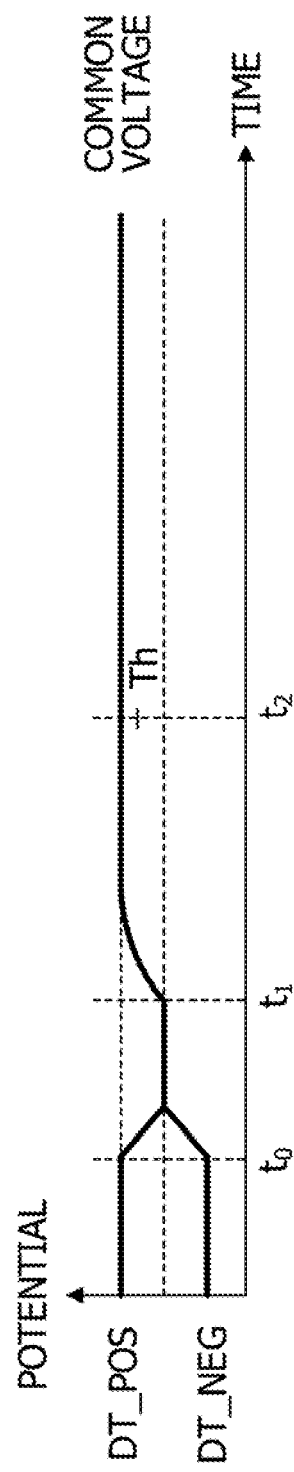
FIG. 7 is a diagram illustrating the common voltage upon the execution of the RX detection in the case where the terminal resistor of the receiving circuit is not connected.

FIG. 7 is a diagram illustrating the common voltage upon the execution of the RX detection in the case where the terminal resistor of the receiving circuit is not connected. An ordinate illustrated in FIG. 7 indicates the output potential of the transmitting circuit 201, and an abscissa illustrated in FIG. 3 indicates time.

At time $t_0$, the entire control circuit 211 starts the RX detection. The entire control circuit 211 causes the driver compensating circuit 241 to operate in the common mode so that the two output signals from the driver compensating circuit 241 are at the same reference potential.

At time $t_1$, after a first time period elapses after the time $t_0$, the predetermined voltage starts being applied to the differential signal lines to which the signals of the driver compensating circuit 241 are output. When the terminal resistor 361 of the receiving circuit 301 is not connected to the first and second input terminals of the receiving circuit 301, the capacitors 401-$i$ for the AC coupling are not to be charged and the common voltage quickly rises.

Thus, at time $t_2$ after a second time period elapses after the time $t_1$, the common voltage is higher than the threshold Th. When the common voltage is higher than the threshold Th at the time $t_2$, the receiver detecting circuit 261 determines that the terminal resistor 361 of the receiving circuit 301 is not connected to the first and second input terminals of the receiving circuit 301. When the common voltage is equal to or lower than the threshold Th at the time $t_2$, the receiver detecting circuit 261 determines that the terminal resistor 361 of the receiving circuit 301 is connected to the first and second input terminals of the receiving circuit 301.

When the terminal resistor 361 of the receiving circuit 301 is not connected to the first and second input terminals of the receiving circuit 301, and the transmitting circuit 201 executes the RX detection in the aforementioned manner, the common voltage is equal to or nearly equal to a voltage in the case where the receiving circuit illustrated in FIG. 5 is not connected.

In the system 101 according to the embodiment, the state of the receiving circuit 301 may be transmitted to the transmitting circuit 201 by the execution of the RX detection. For example, information may be transmitted from the receiving circuit 301 to the transmitting circuit 201 by assigning a specific meaning to information indicating whether the terminal resistor 361 of the receiving circuit 301 is connected to the first and second input terminals of the receiving circuit 301.

Figure 8:
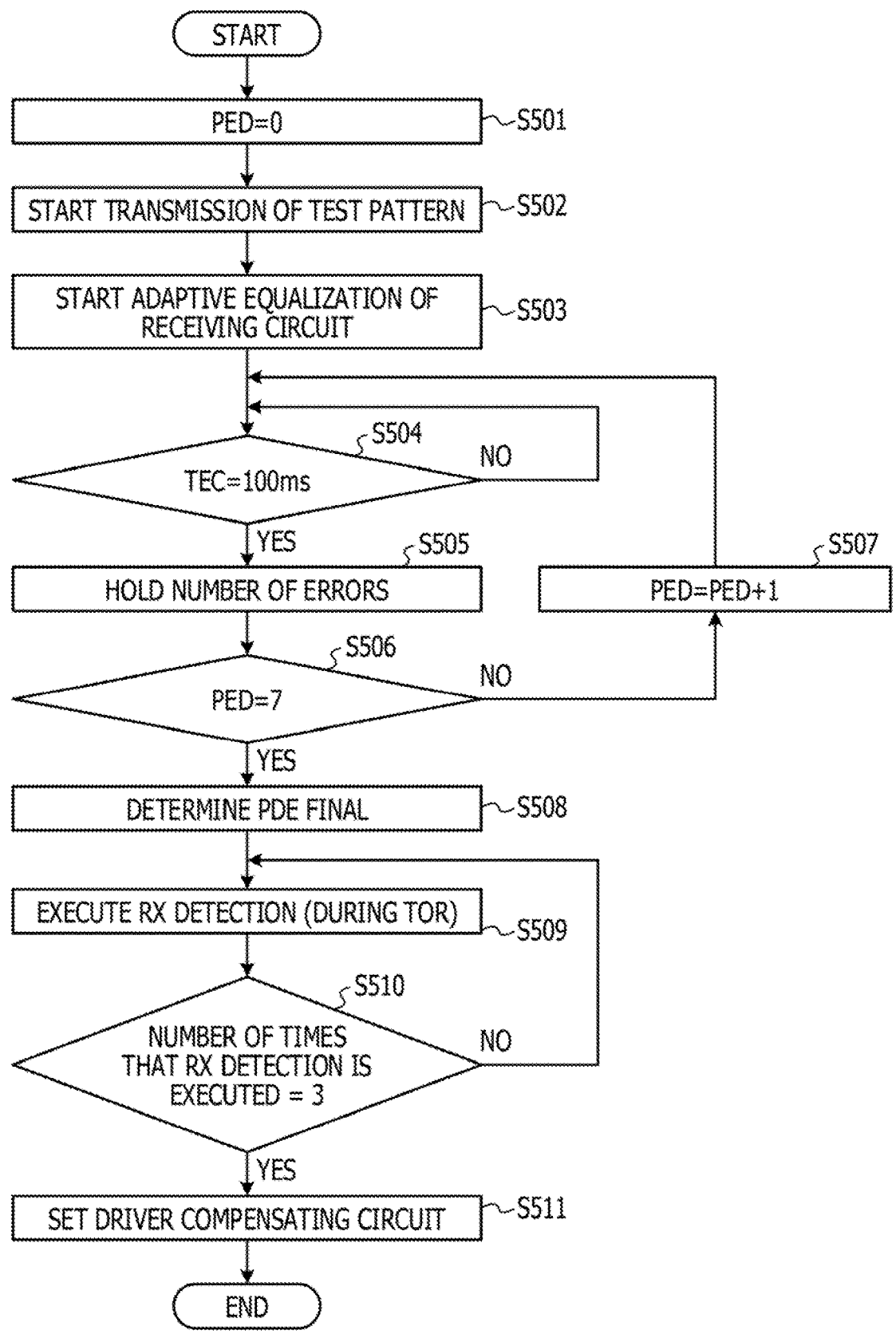
FIG. 8 is a flowchart of a parameter setting method according to the embodiment.

FIG. 8 is a flowchart of a parameter setting method according to the embodiment.

In step S501, the entire control circuit 211 receives an instruction to start setting from the transceiver control circuit 291. The entire control circuit 211 instructs the parameter control circuit 251 to start the setting. The parameter control circuit 251 sets the parameter PDE of the signal compensating function of the driver compensating circuit 241 to 0. In the embodiment, the parameter PDE may be set to any of 8 values of 0 to 7.

In step S502, the entire control circuit 211 instructs the test pattern generating circuit 221 to start the generation of a test pattern. Upon receiving the instruction to start the generation of the test pattern, the test pattern generating circuit 221 generates the test pattern and outputs the generated test pattern to the selecting circuit 231. The selecting circuit 231 outputs the received test pattern to the driver compensating circuit 241. The test pattern generating circuit 221 continuously generates and outputs the test pattern until the test pattern generating circuit 221 receives an instruction to terminate the generation of the test pattern from the entire control circuit 211. The driver compensating circuit 241 adjusts and outputs transmission signals (positive data signal and negative data signal) corresponding to the received test pattern based on the set parameter PDE.

In step S503, the transceiver control circuit 391 instructs the adaptive equalization control circuit 331 to start the adaptive equalization. Upon receiving the instruction to start the adaptive equalization, the adaptive equalization control circuit 331 starts the adaptive equalization and outputs the compensation parameter to the compensating circuit 311. During the execution of the adaptive equalization, the adaptive equalization control circuit 331 detects an error (or a difference between received data and the test pattern generated by the test pattern generating circuit 221) of the received data and adjusts the compensation parameter so that the number of errors of the received data is the smallest. The adaptive equalization control circuit 331 continuously executes the adaptive equalization until the adaptive equalization control circuit 331 receives an instruction to terminate the adaptive equalization from the transceiver control circuit 391. The compensating circuit 311 uses the compensation parameter set by the adaptive equalization control circuit 331 to adjust the input positive data signal and the input negative data signal.

In step S504, the error counting and holding circuit 341 starts counting the number of errors of received data during a current predetermined TEC. After the current predetermined TEC elapses after the start of the counting of the number of errors, control proceeds to step S505. For example, the error counting and holding circuit 341 counts the number of errors of the received data detected during the current predetermined TEC. In the embodiment, each of the predetermined TECs is 100 milliseconds (ms). Since the adaptive equalization control circuit 331 executes the adaptive equalization, the compensation parameter of the compensating circuit 311 is adjusted so that the number of errors of the received data for the set parameter PDE is the smallest upon the start of the counting of the number of errors of the received data.

In step S505, the error counting and holding circuit 341 holds (stores) the number of errors included in the received data and counted during the current predetermined TEC.

In step S506, the parameter control circuit 251 determines whether the parameter PDE is 7. When the parameter PDE is 7, the control proceeds to step S508. When the parameter PDE is not 7, the control proceeds to step S507. When the parameter PDE is 7, the entire control circuit 211 instructs the test pattern generating circuit 221 to terminate the generation of the test pattern.

In step S507, the entire control circuit 211 instructs the parameter control circuit 251 to change the parameter PDE (or add 1 to the parameter PDE). The parameter control circuit 251 adds 1 to the current parameter PDE to obtain a new parameter PDE and outputs the new parameter PDE to the driver compensating circuit 241. The parameter control circuit 251 sets, to the new parameter PDE, the parameter to be used to adjust the transmission signals of the driver compensating circuit 241.

The numbers of errors included in received data and counted during predetermined TECs when the parameter PDE=0 to 7 are held in the error counting and holding circuit 341 by the processes of steps S504 to S507. For example, the 8 counted numbers of errors are held in the error counting and holding circuit 341. For example, the number of errors counted during a first predetermined TEC is the number of errors of received data when the parameter PDE=0. Thus, the number of errors counted during a k-th predetermined TEC is the number of errors of received data when the parameter PDE=k−1. The terminal control circuit 351 finds the minimum number of errors from the 8 counted numbers held in the error counting and holding circuits 341, thereby determining the parameter PDE, causing the number of errors of the received data to be the smallest, of the driver compensating circuit 241.

In step S508, the error counting and holding circuit 341 determines, as a parameter PDE Final, the parameter PDE, causing the number of errors of the received data to be the smallest, of the driver compensating circuit 241, based on the numbers, held in the error counting and holding circuit 341, of errors. For example, when the number of errors counted during the 7th predetermined TEC is the smallest among the numbers of errors counted during the 8 predetermined TECs, the error counting and holding circuit 341 determines that the parameter PDE Final=6. The error counting and holding circuit 341 notifies the parameter PDE Final to the terminal control circuit 351. The entire control circuit 211 instructs the test pattern generating circuit 221 to terminate the generation of the test pattern. The terminal control circuit 351 may determine, as the parameter PDE Final, the parameter PDE, causing the number of errors of the received data to be the smallest, of the driver compensating circuit 241, based on the numbers, held in the error counting and holding circuit 341, of errors. The parameter PE Final is an example of a second parameter.

In step S509, the entire control circuit 211 and the receiver detecting circuit 261 execute the RX detection to determine, based on the output potential of the transmitting circuit 201, whether the terminal resistor 361 is connected to the first and second input terminals of the receiving circuit 301. The receiver detecting circuit 261 holds (stores) the result of the determination. The terminal control circuit 351 controls the switches 371-i based on the parameter PDE Final and the number of times that the RX detection is executed. A time period for executing the RX detection once is a fixed term of optimization by the RX detection (TOR). The terminal control circuit 351 controls, for each fixed TOR, the switches 371-i based on the parameter PDE Final and the number of times that the RX detection is executed. An example of the control of the switches 371-i based on the parameter PDE Final and the number of times that the RX detection is executed is described later.

In step S510, the receiver detecting circuit 261 adds 1 to an execution number indicating the number of times that the RX detection is executed and the receiver detecting circuit 261 determines whether the execution number is 3. An initial value of the execution number is 0. When the execution number is 3, the control proceeds to step S511. When the execution number is not 3, the control returns to step S509. For example, the RX detection is executed three times.

An example of the control of the switches 371-i based on the parameter PDE Final and the number of times that the RX detection is executed is described below.

In the embodiment, the terminal control circuit 351 controls the switches 371-i based on a j-th (j=1 to 3) bit value from the lowest order bit value of the parameter PDE Final expressed in binary in the j-th RX detection. For example, upon the execution of the j-th RX detection, when the j-th bit value from the lowest order bit value of the parameter PDE Final expressed in binary is 1, the terminal control circuit 351 turns on the switches 371-i and connects the terminal resistor 361 to the input terminals of the receiving circuit 301. Upon the execution of the j-th RX detection, when the j-th bit value from the lowest order bit value of the parameter PDE Final expressed in binary is 0, the terminal control circuit 351 turns off the switches 371-i and does not connect the terminal resistor 361 to the input terminals of the receiving circuit 301. In the embodiment, a state in which the switches 371-i are in the ON states and the terminal resistor 361 is connected to the input terminals of the receiving circuit 301 is referred to as terminal resistor ON state. In the embodiment, a state in which the switches 371-i are in the OFF states and the terminal resistor 361 is not connected to the input terminals of the receiving circuit 301 is referred to as terminal resistor OFF state.

Figure 9:
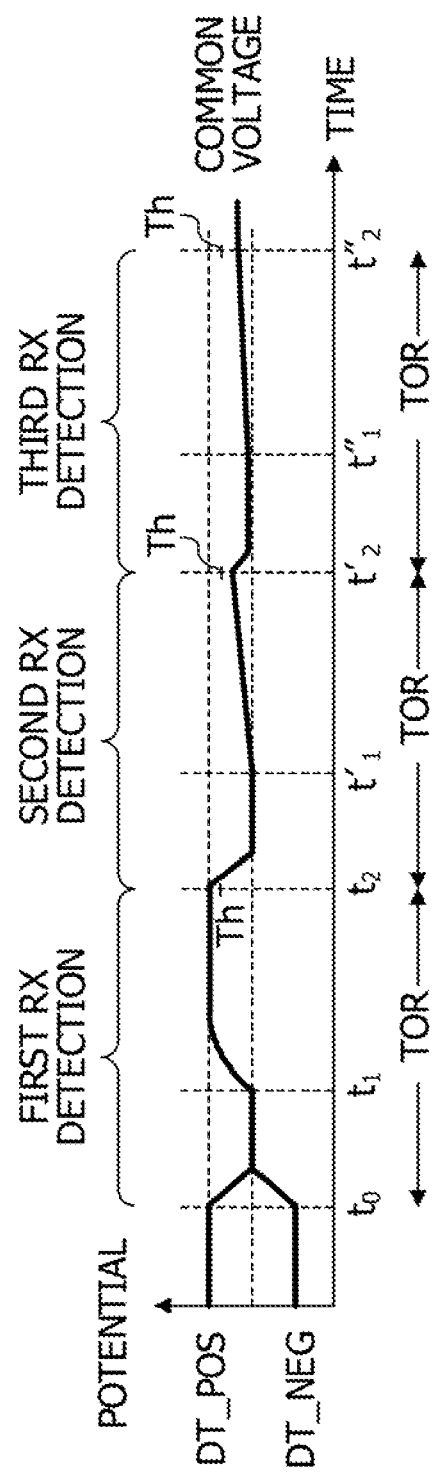
FIG. 9 is a diagram illustrating an example of the common voltage upon the execution of the RX detection according to the embodiment.

FIG. 9 is a diagram illustrating an example of the common voltage upon the execution of the RX detection according to the embodiment.

FIG. 9 assumes that the parameter PDE Final is 6. When the parameter PDE Final=6 is expressed in binary, the parameter PDE Final is 110b. Thus, the terminal control circuit 351 turns off the switches 371-i upon the execution of the first RX detection and turns on the switches 371-i upon the execution of the second and third RX detection.

At time $t_0$, the entire control circuit 211 starts the first RX detection. The entire control circuit 211 causes the driver compensating circuit 241 to operate in the common mode so that the two output signals from the driver compensating circuit 241 are at the same reference potential. As described above, the terminal control circuit 351 turns off the switches 371-i upon the execution of the first RX detection.

At time $t_1$, after a first time period elapses after the time $t_0$, the predetermined voltage starts being applied to the differential signal lines to which the signals of the driver compensating circuit 241 are output. Since the terminal resistor 361 of the receiving circuit 301 is not connected to the first and second input terminals of the receiving circuit 301, the common voltage quickly rises.

Thus, at time $t_2$ after a second time period elapses after the time $t_1$, the common voltage is higher than the threshold Th. Thus, the receiver detecting circuit 261 determines the terminal resistor OFF state in the first RX detection. A time period from the time $t_0$ to the time $t_2$ corresponds to a fixed TOR.

At the time $t_2$, the entire control circuit 211 starts the second RX detection. The entire control circuit 211 causes the driver compensating circuit 241 to operate in the common mode so that the two output signals from the driver compensating circuit 241 are at the same reference potential. As described above, the terminal control circuit 351 turns on the switches 371-i upon the execution of the second RX detection.

At time $t'_1$ after a first time period elapses after the time $t_2$, the predetermined voltage starts being applied to the differential signal lines to which the signals of the driver compensating circuit 241 are output. Since the terminal resistor 361 of the receiving circuit 301 is connected to the first and second input terminals of the receiving circuit 301, the rising of the common voltage is slow.

Thus, at time $t'_2$ after a second time period elapses after the time $t'_1$, the common voltage is equal to or lower than the threshold Th. Thus, the receiver detecting circuit 261 determines the terminal resistor ON state in the second RX detection. A time period from the time $t_2$ to the time $t'_2$ corresponds to a fixed TOR.

At the time $t'_2$, the entire control circuit 211 starts the third RX detection. The entire control circuit 211 causes the driver compensating circuit 241 to operate in the common mode so that the two output signals from the driver compensating circuit 241 are at the same reference potential. As described above, the terminal control circuit 351 turns on the switches 371-i upon the execution of the third RX detection.

At time $t''_1$ after a first time period elapses after the time $t'_2$, the predetermined voltage starts being applied to the differential signal lines to which the signals of the driver compensating circuit 241 are output. Since the terminal resistor 361 of the receiving circuit 301 is connected to the first and second input terminals of the receiving circuit 301, the rising of the common voltage is slow.

Thus, at time $t''_2$ after a second time period elapses after the time $t''_1$, the common voltage is equal to or lower than the threshold Th. Accordingly, the receiver detecting circuit 261 determines the terminal resistor ON state in the third RX detection. A time period from the time $t'_2$ to the time $t''_2$ corresponds to a fixed TOR.

In the embodiment, the parameter PDE may be set to any of the 8 values of 0 to 7. When the parameter PDE has 3 bits, the parameter PDE may be expressed by any of the 8 values. Thus, in the embodiment, the system 101 executes the RX detection three times. The number of times that the RX detection is executed may be changed based on the number of values settable to the parameter PDE.

Return to FIG. 8 to continue the description.

In step S511, the receiver detecting circuit 261 detects the parameter PDE Final determined by the receiving circuit 301 based on determination results of the RX detection executed three times. In the embodiment, the terminal resistor ON state is indicated by 1 and the terminal resistor OFF state is indicated by 0. In the embodiment, a value corresponding to a determination result of the j-th RX detection indicates the j-th bit value from the lowest order bit value of the parameter PDE Final expressed in binary. For example, it is assumed that determination results of the first, second, and third RX detection indicate the terminal resistor OFF state (=0), the terminal resistor ON state (=1), and the terminal resistor ON state (=1), respectively. In this case, the receiver detecting circuit 261 determines that the parameter PDE Final is 110b=6. The receiver detecting circuit 261 notifies the parameter PDE Final to the parameter control circuit 251. The parameter control circuit 251 outputs the parameter PDE Final to the driver compensating circuit 241 and sets, to the parameter PDE Final, the parameter to be used to adjust the transmission signals of the driver compensating circuit 241. The entire control circuit 211 notifies the completion of the setting of the driver compensating circuit 241 to the transceiver control circuit 291.

Normally, power consumed by a receiving compensating circuit is higher than power consumed by a transmitting compensating circuit. When an adjusted amount of a signal to be received by the receiving compensating circuit is large, the receiving compensating circuit is large in size and power to be consumed by the receiving compensating circuit increases. In a related-art technique, since a parameter of a transmitting compensating circuit is a fixed value, a transmission signal is not adjusted using a parameter that causes the number of error of received data to be the smallest. Thus, an adjusted amount of a signal received by a receiving compensating circuit is large, the receiving compensating circuit is large in size, and power consumed by the receiving compensating circuit increases.

On the other hand, in the embodiment, since the transmitting compensating circuit adjusts a transmission signal using the parameter that causes the number of errors of received data to be the smallest, an adjusted amount of the signal received by the receiving compensating circuit is smaller than the related-art technique. Thus, in the system according to the embodiment, the size of the receiving compensating circuit may be smaller and power to be consumed by the receiving compensating circuit may be lower than those in the related-art technique.

In the system according to the embodiment, since the transmitting compensating circuit adjusts a transmission signal so that the number of errors of the transmission signal is small, an adjusted amount of the signal received by the receiving compensating circuit is small. Thus, the receiving circuit may be small in size and power to be consumed by the receiving circuit may be reduced.

In the parameter setting transmission and reception system according to the embodiment, the parameter of the transmitting circuit may be set so that the number of errors of received data is small.

In the system according to the embodiment, the number of constituent elements to be newly added to the transmitting circuit and the receiving circuit may be reduced by using the RX detection function of detecting the connection of the receiving circuit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parameter setting transmission and reception system comprising:
   a transmitter; and
   a receiver that is connected to the transmitter via a transmission path,
   the transmitter transmits a first adjustment signal obtained by adjusting a transmission signal of a test pattern based on a first parameter,
   the transmitter detects, based on an output potential of the transmitter, a second parameter that is among values settable to the first parameter and has been determined by the receiver,
   the transmitter sets the second parameter determined by the receiver,
   the receiver includes a terminal resistor that is connected to an input terminal of the receiver, and the input terminal of the receiver is connected to the transmission path, and
   the receiver is configured to
   receive the first adjustment signal from the transmitter and acquire a second adjustment signal by adjusting the first adjustment signal based on a third parameter,
   set the third parameter,
   count the number of errors of the second adjustment signal based on a difference between the second adjustment signal and the test pattern,
   determine, based on the number of errors of the second adjustment signal, the second parameter to be set in the transmitter, and
   control the connection of the terminal resistor to the input terminal based on the second parameter determined by the receiver, the terminal resistor is configured to inhibit the transmission signal from being reflected at the transmission path.

2. The parameter setting transmission and reception system according to claim 1, wherein the receiver connects or disconnects the terminal resistor to or from the input terminal at each of predetermined time intervals based on a value of the second parameter expressed in binary.

3. The parameter setting transmission and reception system according to claim 1, wherein the receiver determines, as the second parameter, a parameter that is among the values settable to the first parameter and corresponds to the minimum number of errors among the numbers of errors of the second adjustment signal.

4. The parameter setting transmission and reception system according to claim 2, wherein the transmitter determines, at each of the predetermined time intervals, whether the terminal resistor is connected to the input terminal, and the transmitter detects the second parameter based on a result of the determination at each of the predetermined time intervals.

5. A parameter setting method to be executed in a parameter setting transmission and reception system including a transmitter and a receiver that is connected to the transmitter via a transmission path, comprising:

causing the transmitter to transmit a first adjustment signal obtained by adjusting a transmission signal of a test pattern based on a first parameter;

causing the transmitter to detect, based on an output potential of the transmitter, a second parameter that is among values settable to the first parameter and has been determined by the receiver;

causing the transmitter to set the second parameter in the transmitter that adjusts the transmission signal;

causing the receiver, which has a terminal resistor that is connected to an input terminal that is included in the receiver and connected to the transmission path, to receive the first adjustment signal from the transmitter;

causing the receiver to adjust the received first adjustment signal based on a third parameter to obtain a second adjustment signal;

causing the receiver to set the third parameter;

causing the receiver to count the number of errors of the second adjustment signal based on a difference between the second adjustment signal and the test pattern;

causing the receiver to determine, based on the number of errors of the second adjustment signal, the second parameter to be set in the transmitter; and causing the receiver to control the connection of the terminal resistor to the input terminal based on the second parameter, the terminal resistor is configured to inhibit the transmission signal from being reflected at the transmission path.

* * * * *